United States Patent
Turnquist et al.

(10) Patent No.: US 6,951,339 B2
(45) Date of Patent: Oct. 4, 2005

(54) BRUSH SEAL FOR STATIC TURBINE COMPONENTS

(75) Inventors: Norman Arnold Turnquist, Sloansville, NY (US); Mark Edward Burnett, Buskirk, NY (US); Huseyin Kizil, Troy, NY (US); Kamlesh Mundra, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/926,001

(22) Filed: Aug. 26, 2004

(65) Prior Publication Data

US 2005/0017458 A1 Jan. 27, 2005

Related U.S. Application Data

(63) Continuation of application No. 10/294,546, filed on Nov. 15, 2002, now abandoned.

(51) Int. Cl.$^7$ .......................... F16J 15/02; F01D 11/02
(52) U.S. Cl. ...................................... 277/628; 277/355
(58) Field of Search ................................ 277/350, 355, 277/418–422, 412

(56) References Cited

U.S. PATENT DOCUMENTS

| | | |
|---|---|---|
| 5,074,748 A | 12/1991 | Hagle |
| 5,106,104 A | 4/1992 | Atkinson et al. |
| 5,181,728 A | 1/1993 | Stec |
| 5,318,309 A | 6/1994 | Tseng et al. |
| 5,474,306 A | 12/1995 | Bagepalli et al. |
| 5,630,590 A | 5/1997 | Bouchard et al. |
| 5,749,584 A | 5/1998 | Skinner et al. |
| 5,961,279 A | 10/1999 | Ingistov |
| 6,045,134 A | 4/2000 | Turnquist et al. |
| 6,105,967 A * | 8/2000 | Turnquist et al. ............ 277/355 |
| 6,131,019 A * | 10/2000 | King ............................ 455/99 |
| 6,131,910 A | 10/2000 | Bagepalli et al. |
| 6,131,911 A * | 10/2000 | Cromer et al. ............... 277/355 |
| 6,139,018 A * | 10/2000 | Cromer et al. ............... 277/355 |
| 6,250,641 B1 | 6/2001 | Dinc et al. |
| 6,331,006 B1 * | 12/2001 | Baily et al. .................. 277/355 |

* cited by examiner

Primary Examiner—Alison Pickard
Assistant Examiner—Vishal Patel
(74) Attorney, Agent, or Firm—Nixon & Vanderhye, P.C.

(57) ABSTRACT

A brush seal is provided between static components of a turbine. The turbine flowpath has an inlet spaced from another the inner web of the first stage nozzle. A brush seal is disposed between the two static components to minimize leakage flow to the packing casing region. The bristles of the brush seal are preloaded to fill any gap between the static components caused by distortion or out-of-roundness of the opposed surfaces being sealed. A side plate may contact the opposed sealing surface, increasing the pressure capability of the brush seal and minimizing overall seal leakage by providing the minimum possible flow area restricted solely by the bristles.

10 Claims, 5 Drawing Sheets

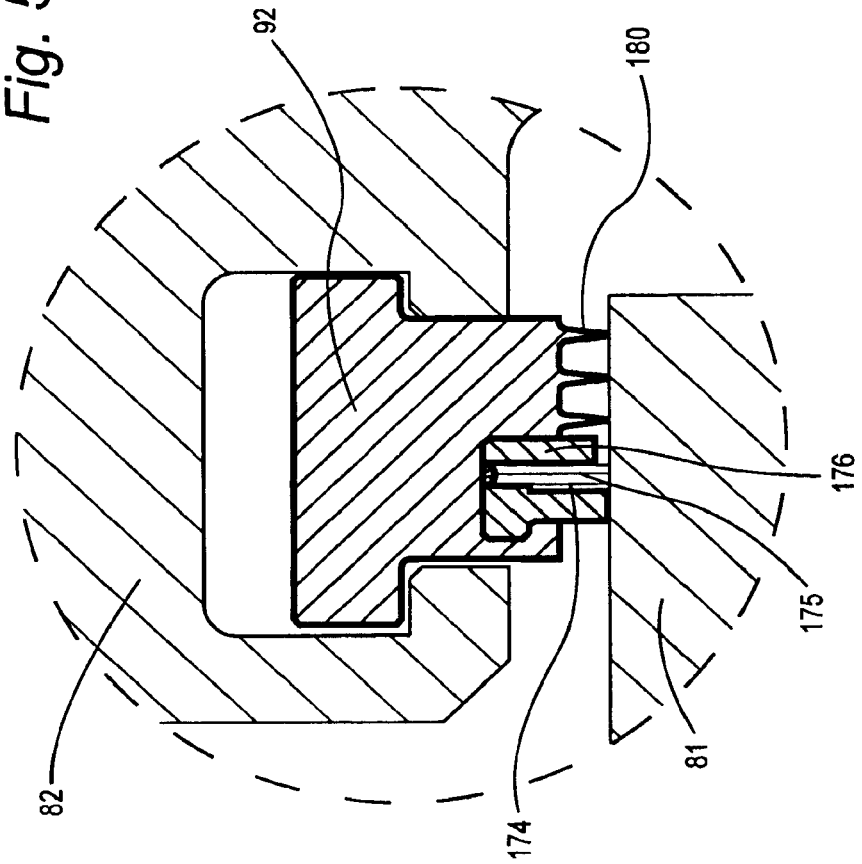

BRUSH SEAL FOR STATIC TURBINE COMPONENTS

This application is a continuation of U.S. application Ser. No. 10/294,546, filed Nov. 15, 2002, now abandoned the disclosure of which is incorporated by reference hereto.

BACKGROUND OF THE INVENTION

The present invention relates to a brush seal for sealing between static components of a turbine and particularly relates to a brush seal for sealing between an inlet and the inner web of a first stage nozzle to minimize leakage flows into the inlet packing ring region of a steam turbine.

Seals are oftentimes employed between static components of a turbine. For example, in a steam turbine, static seals are employed in the inlet region to minimize steam leakage flows into packing ring locations between the packing ring casing and the rotor and forming the high pressure end seals. The seals, for example, between the inlet and the inner web of the first stage nozzle have included a plurality of labyrinth seal teeth mounted on sealing ring segments which may be spring biased to engage and seal against the opposing component. The packing ring seals carrying the labyrinth teeth can be preloaded and oriented in either radially outward or radially inward directions, depending on which component of the inlet region the seals are mounted. While labyrinth seals have been effective for minimizing leakage flows in these high pressure regions, the static annular or cylindrical components may become out-of-round or distorted which can result in increased leakage flow from the high pressure region to the high pressure end seal packing ring region. Thermal distortion or creep of one or both of the components can cause an out-of-roundness and the creation of a gap between the tips of the labyrinth seal teeth and the surface that they are sealing against. Thus, as long as the labyrinth seal teeth and the component parts remain circular, the labyrinth teeth are effective to minimize leakage flows. However, if one or both of the sealing surfaces becomes out-of-round, a generally crescent-shaped gap is created between the tips of the teeth and the adjacent sealing surface, resulting in leakage across the seal through the gap and a performance loss. Any increased leakage past the labyrinth seal teeth decreases the effectiveness of the energetic fluid, e.g., steam, flowing along the flowpath of the turbine. Consequently, there is a need for a sealing arrangement between static components of a turbine which will accommodate distortion or out-of-roundness of the components to be sealed while maintaining an effective seal.

In a preferred embodiment according to the present invention, there is provided a static seal for a turbine, comprising first and second stationary turbine components having respective first and second surfaces in opposition to one another, at least one of the first components being subject to distortion, opening a gap between the first surface and the second surface and a brush seal carried by one of the first and second components having a plurality of bristles with an initial interference between tips of the bristles and another of the first and second components for compliant engagement with another of the first and second components maintaining the seal between the surfaces and across the gap.

In a further preferred embodiment according to the present invention, there is provided a steam path including a steam inlet and a first stage nozzle having an inner web, the inlet and inner web having respective first and second surfaces in generally radial opposition to one another, at least one of the inlet and the inner web being subject to distortion opening a gap between the first surface and said second surface and a brush seal carried by one of the inlet and the inner web having a plurality of bristles with an initial interference between tips of the bristles and another of the inlet and the inner web for compliant engagement with another of the inlet and the inner web maintaining a static seal between the surfaces and across the gap.

BRIEF DESCRIPTION OF THE DRAWINGS

FIG. 5 is an enlarged fragmentary cross-sectional view of the static seal illustrated in FIG. 4.

DETAILED DESCRIPTION OF THE INVENTION

Figure 1:
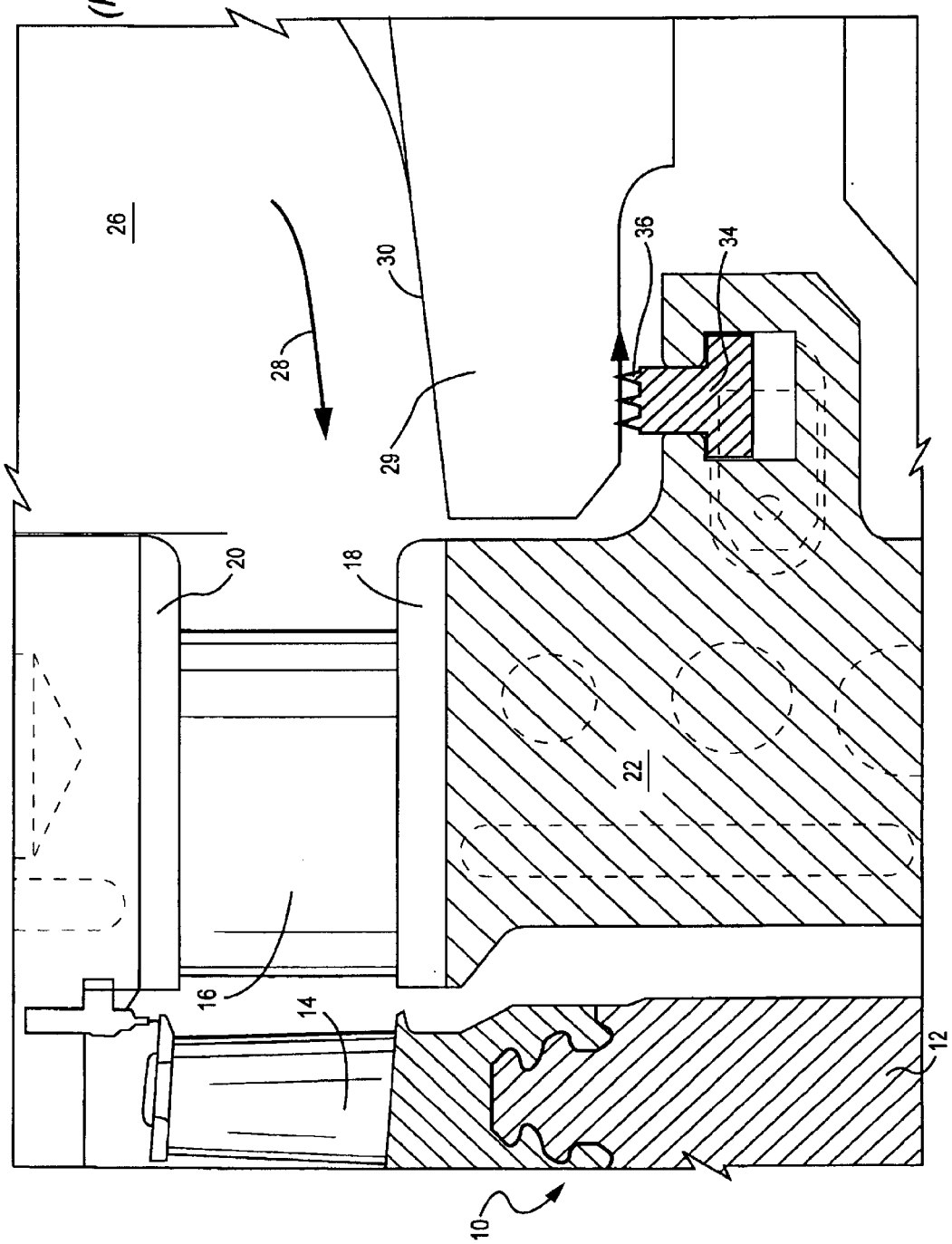
FIG. 1 is a fragmentary cross-sectional view illustrating a flowpath for the first stage of a turbine including conventional seals between the turbine inlet and inner web of the first stage nozzle according to the prior art.

Referring now to the drawings, particularly to FIG. 1, there is illustrated a rotary component of a turbine, generally designated 10, including a rotor having a rotor wheel 12 mounting a plurality of circumferentially spaced buckets 14 and rotatable about an axis. A stationary component of the turbine includes a nozzle 16 formed of a plurality of circumferentially spaced airfoils extending between inner and outer bands 18 and 20, respectively, and carrying an inner web 22. Fluid, for example, steam, is provided an inlet region 26 for flow through the nozzle 16 and buckets 14, which form a portion of the flowpath indicated by the arrow 28 through the turbine. Inlet region 26 includes an inlet 29 adjacent the inner web 22, the inlet 29 having an outer surface 30 in part defining the fluid flowpath 28 into the first stage of the turbine defined by the nozzles 16 and buckets 14. The inlet 29 and inner web 22 are typically sealed one to the other by a plurality of annular packing ring segments 34 carrying a plurality of labyrinth seal teeth 36. Packing ring segments 34 are generally spring biased such that the labyrinth teeth 36 lie in close proximity to the opposed sealing surface of inlet 29. In this conventional configuration, the seal ring segments 34 have labyrinth teeth 36 directed generally in a radially outward direction.

Figure 2:
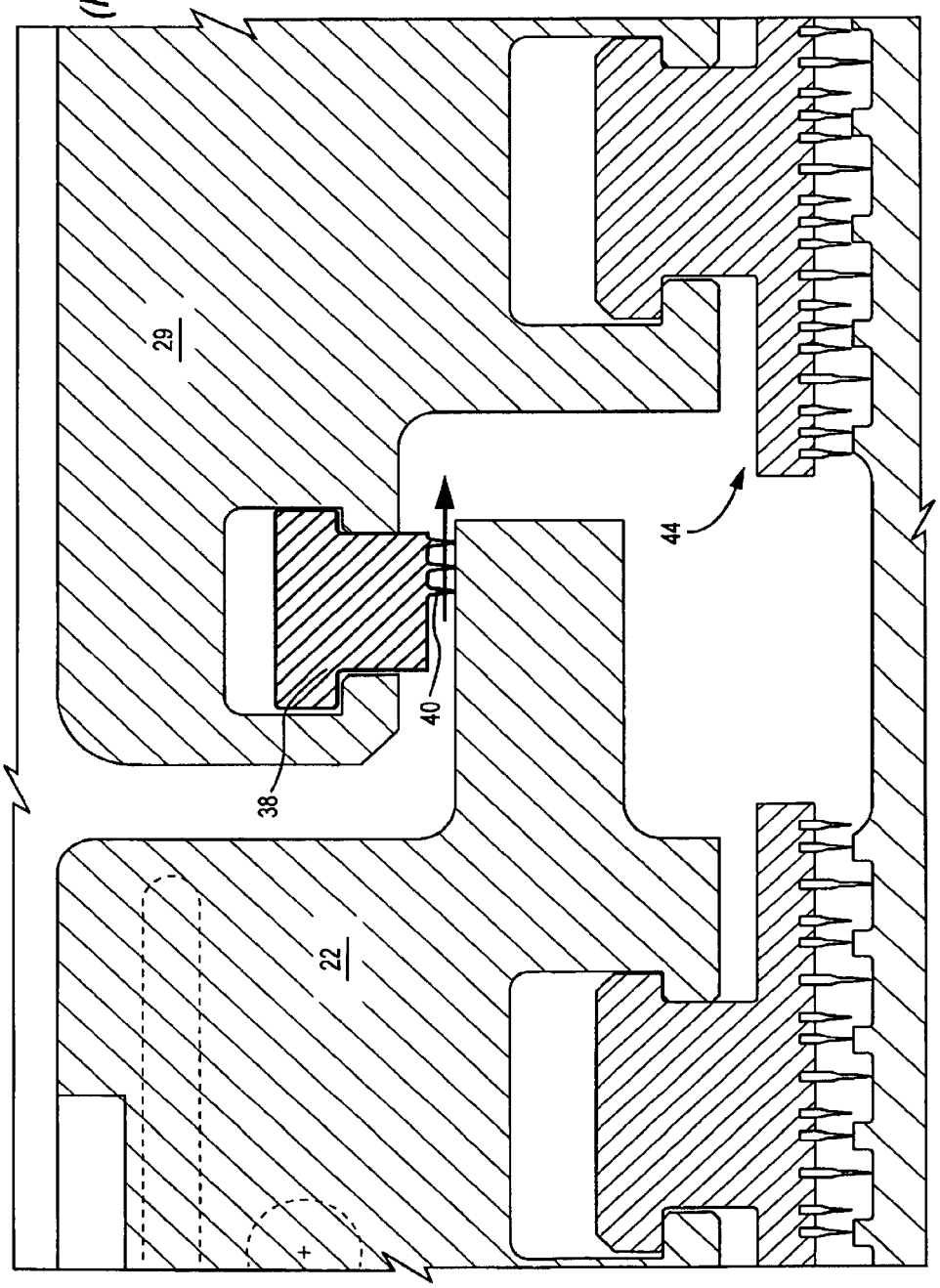
FIG. 2 is a view similar to FIG. 1 illustrating a different form of prior art seal.

Referring to FIG. 2, which illustrates a further form of prior art seal between an inlet 29 for a turbine and an inner web 22, the seal between the inlet 29 and inner web 22 includes a plurality of circumferentially spaced packing ring segments 38 mounting labyrinth seal teeth 40 for minimizing leakage flow into the packing ring region, generally designated 44. As illustrated in FIGS. 1 and 2, the packing ring segments 34 and 38 can be directed radially outwardly or inwardly, respectively. The packing ring segments and inlet or inner web member, as applicable, form a static seal between the inlet and inner web. As indicated previously, distortion of one or both of these components, however, may cause the component(s) to become out-of-round, creating a gap, for example, a crescent-shaped gap, between the out-of-round components. Any such gap causes increased leakage past the labyrinth seal teeth and a consequent turbine performance loss.

Figure 3:
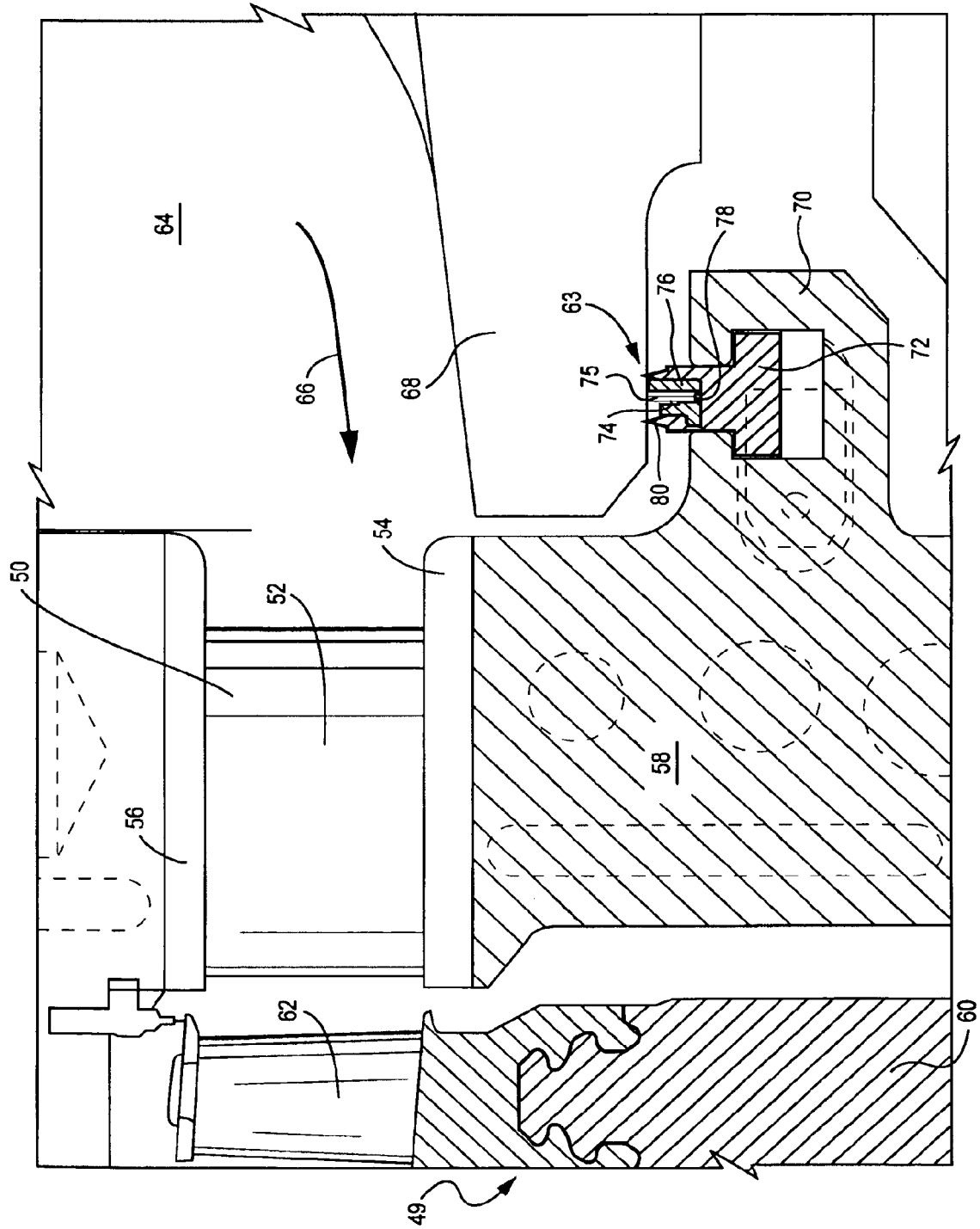
FIG. 3 is a fragmentary cross-sectional view of the inlet region of a turbine illustrating a static seal according to a preferred embodiment of the present invention.

In accordance with a preferred embodiment of the present invention as illustrated in FIG. 3, there is provided a brush seal for sealing between static components of a turbine. The turbine, generally designated 49, includes a nozzle 50 including a plurality of airfoils 52 circumferentially spaced one from the other between inner and outer bands 54 and 56 and carrying an inner web 58. The rotor includes a rotor wheel 60 mounting a plurality of buckets 62. In the inlet region 64 of the turbine flowpath indicated 66, a static seal, generally indicated 63, is disposed between the inlet 68 and a flange 70 of the inner web 58. The seal 63 is preferably comprised of a plurality of arcuate packing ring segments 72 each mounting a brush seal 74. The brush seal comprises a plurality of bristles 75 which may be formed of metal or non-metallic materials, such as ceramics, carbon fiber or silica, disposed between a pair of side plates 76 on opposite axial sides of bristles 75. The side plates and bristles are preferably secured to one another by welding, for example, as illustrated at 78, although it will be appreciated that other modalities of securement may be used such as crimping, high temperature glues or adhesive. Brush seal 74 is formed in a groove of the packing ring segment which may also include one or more labyrinth seal teeth 80 in combination with the brush seal 74. Preferably, the bristles 75 of the brush seal are assembled with an interference to the adjacent sealing surface, e.g., the inlet 68. That is, a preload is provided on the bristles to fill any radial gap between the static components being sealed, i.e., the inlet and inner web, in the event that one or more of the components becomes out-of-round due to distortion or creep. The preload on the bristles causes the tips of the bristles to fill any such gap. In FIG. 3, the packing ring segments 72 are preferably biased in a radial outward direction, maintaining the tips of the bristles in engagement with the inlet 68.

Figure 4:
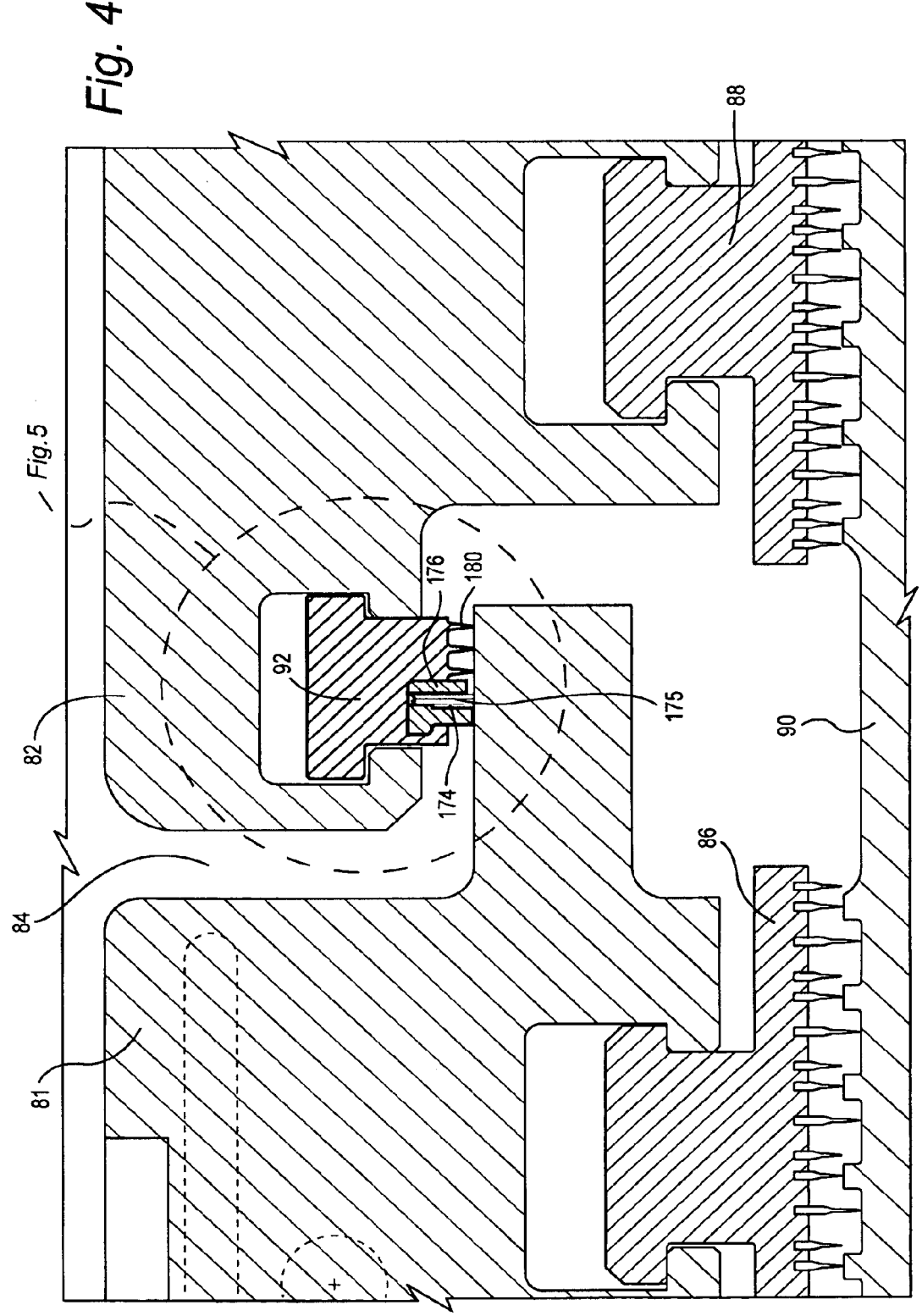
FIG. 4 is a view similar to FIG. 3 illustrating a further form of static seal hereof.

Referring now to FIG. 4 illustrating a further embodiment of the present invention, there is illustrated a pair of stationary components 81 and 82 forming a leakage path 84 for fluid, e.g., steam, to a location between packing rings 86 and 88 forming part of the packing ring end seal region. Packing rings 86 and 88 form seals with the turbine rotor 90 at the high pressure end of the turbine. Between the static components 81 and 82, there are provided a plurality of arcuate packing ring segments 92 which are preferably spring biased in a radial inward direction. Each packing ring segment 92 mounts a brush seal 174 including side plates 176 which straddle bristles 175. The tips of the bristles 175 project from the packing ring segments for engagement with a surface on the static component 81 forming a seal between static components 81 and 82. The packing ring segments 92 may also include one or more labyrinth seal teeth 180 forming a combination brush/labyrinth seal. As in the previous embodiment, the bristles 175 are preloaded, enabling the tips of the bristles to continuously engage the surface of the opposing static component 81. By preloading the bristles 175, it is also possible to locate the backing plate supporting the bristles in contact with the adjacent sealing surface. By providing this metal-to-metal contact, the pressure capability of the brush seal is increased and overall seal leakage is minimized, i.e., the minimum possible flow area restricted solely by the bristle pack is minimized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A static seal for a turbine, comprising:

first and second stationary turbine components having respective first and second surfaces in opposition to one another, at least one of said first components being subject to distortion, opening a gap between said first surface and said second surface;

a brush seal carried by one of said first and second components having a plurality of bristles with an initial interference between tips of the bristles and another of said first and second components for compliant engagement with said another of the first and second components maintaining the seal between the surfaces and across the gap;

said one component carrying at least one labyrinth seal tooth;

said brush seal including at least one side plate on one side of the bristles for backing the bristles, said one side plate being carried by and extending from said one component toward another of said first and second components; and said one side plate lying in contact with said another of said first and second components.

2. A seal according to claim 1 wherein said surfaces are generally cylindrical and concentric relative to one another about an axis of the turbine, said bristles extending generally in a radial direction.

3. A seal according to claim 2 wherein said bristles project in a generally radially outward direction.

4. A seal according to claim 2 wherein said bristles project in a generally radially inward direction.

5. A seal according to claim 1 wherein said bristles are biased for movement of said bristle tips toward said another of said first and second components upon the opening of the gap between said surfaces to fill the gap with said bristle tips.

6. A steam path including a steam inlet and a first stage nozzle having an inner web;

said inlet and said inner web having respective first and second surfaces in generally radial opposition to one another, at least one of said inlet and said inner web being subject to distortion opening a gap between said first surface and said second surface;

a brush seal carried by one of said inlet and said inner web having a plurality of bristles with an initial interference between tips of the bristles and another of said inlet and said inner web for compliant engagement with said another of said inlet and said inner web maintaining a static seal between the surfaces and across the gap;

said one of said inlet and said inner web carrying at least one labyrinth seal tooth;

said brush seal including at least one side plate on one side of the bristles for backing the bristles, said one side plate being carried by and extending from said one of said inlet and said inner web toward said another of said inlet and said inner web; and said one side plate lying in contact with said another of said inlet and said inner web.

7. A turbine according to claim 6 wherein said surfaces are generally cylindrical and concentric relative to one another about an axis of the turbine, said bristles extending generally in a radial direction.

8. A turbine according to claim 7 wherein said bristles are carried by said inner web and project in a generally radially outward direction with the bristle tips in engagement with said inlet.

9. A turbine according to claim 7 wherein said bristles are carried by said inlet and project in a generally radially inward direction with said bristle tips in engagement with said inner web.

10. A turbine according to claim 6 wherein said bristles are biased for movement of said bristle tips toward said another of said inlet and said inner web upon the opening of the gap between said surfaces to fill the gap with said bristle tips.

* * * * *